(12) United States Patent
Wijaya et al.

(10) Patent No.: US 7,233,914 B1
(45) Date of Patent: Jun. 19, 2007

(54) TECHNIQUE FOR IMPLEMENTING ITEM SUBSTITUTION FOR UNAVAILABLE ITEMS RELATING TO A CUSTOMER ORDER

(76) Inventors: Joyo Wijaya, 125 Seminary Dr., Menlo Park, CA (US) 94025; Louis H. Borders, 435 Tasso St., #300, Palo Alto, CA (US) 94301

( * ) Notice: Subject to any disclaimer, the term of this patent is extended or adjusted under 35 U.S.C. 154(b) by 418 days.

(21) Appl. No.: 09/750,385

(22) Filed: Dec. 27, 2000

(51) Int. Cl.
*G06Q 30/00* (2006.01)

(52) U.S. Cl. .............................. 705/26; 705/7; 705/14; 705/27; 705/28; 705/29

(58) Field of Classification Search ................ 705/26, 705/27, 28, 29, 7, 8, 9, 10, 14; 235/383
See application file for complete search history.

(56) References Cited

U.S. PATENT DOCUMENTS

| | | | |
|---|---|---|---|
| 2,781,643 | A | 2/1957 | Fairweather |
| 3,406,532 | A | 10/1968 | Rowand et al. |
| 3,670,867 | A | 6/1972 | Traube |
| 4,213,310 | A | 7/1980 | Buss |
| 4,455,453 | A | 6/1984 | Parasekvakos et al. |
| 4,656,591 | A | 4/1987 | Goldberg |
| 4,799,156 | A | 1/1989 | Shavit et al. |
| 4,887,208 | A | 12/1989 | Schneider et al. |
| 4,936,738 | A | 6/1990 | Brennan |
| 5,038,283 | A | 8/1991 | Caveney |
| 5,093,794 | A | 3/1992 | Howie et al. |
| 5,105,627 | A | 4/1992 | Kurita |
| 5,122,959 | A | 6/1992 | Nathanson et al. |
| 5,235,819 | A | 8/1993 | Bruce |
| 5,237,158 | A | 8/1993 | Kern et al. |
| 5,246,332 | A | 9/1993 | Bernard |
| 5,265,006 | A | 11/1993 | Asthana |
| 5,272,638 | A | 12/1993 | Martin et al. |
| 5,273,392 | A | 12/1993 | Bernard |
| 5,322,406 | A | 6/1994 | Pippin et al. |
| 5,363,310 | A | 11/1994 | Haj-Ali-Ahmadi et al. |
| 5,395,206 | A | 3/1995 | Cerny, Jr. |
| 5,428,546 | A | 6/1995 | Shah et al. |
| 5,533,361 | A | 7/1996 | Halpern |
| 5,548,518 | A | 8/1996 | Dietrich et al. |

(Continued)

FOREIGN PATENT DOCUMENTS

FR 2696722 4/1994

(Continued)

OTHER PUBLICATIONS

"Management of Multi-Item Retail Inventory Systems With Demand Substitution"; Smith, Stephen; Agrawal, Narendra; Operations Research; vol. 48, No. 1, Jan.-Feb. 2000, pp. 50-64.*

(Continued)

*Primary Examiner*—Michael Cuff
*Assistant Examiner*—M. Thein

(57) ABSTRACT

A technique is disclosed for automatically implementing item substitutions for unavailable items in a customer order. According to one embodiment, line item orders from selected customer orders may be aggregated and processed for substitution analysis. Substitutions for unavailable items of selected customer orders may then be automatically implemented based upon substitution instructions, business rules, and/or other predefined criteria.

36 Claims, 8 Drawing Sheets

U.S. PATENT DOCUMENTS

| | | |
|---|---|---|
| 5,593,269 A | 1/1997 | Bernard |
| 5,615,121 A | 3/1997 | Babayev et al. |
| 5,666,493 A | 9/1997 | Wojcik et al. |
| 5,694,551 A | 12/1997 | Doyle et al. |
| 5,712,989 A | 1/1998 | Johnson et al. |
| 5,758,313 A | 5/1998 | Shah et al. |
| 5,758,328 A | 5/1998 | Giovannoli |
| 5,761,673 A | 6/1998 | Bookman et al. |
| 5,768,139 A | 6/1998 | Pippin et al. |
| H1743 H | 8/1998 | Graves et al. |
| 5,809,479 A | 9/1998 | Martin et al. |
| 5,826,242 A | 10/1998 | Montulli |
| 5,826,825 A | 10/1998 | Gabriet |
| 5,831,860 A | 11/1998 | Foladare et al. |
| 5,832,457 A | 11/1998 | Cherney |
| 5,834,753 A | 11/1998 | Danielson et al. |
| 5,835,914 A | 11/1998 | Brim |
| 5,839,117 A * | 11/1998 | Cameron et al. ............. 705/27 |
| 5,848,395 A | 12/1998 | Edgar et al. |
| 5,878,401 A * | 3/1999 | Joseph ........................ 705/22 |
| 5,880,443 A | 3/1999 | McDonald et al. |
| 5,893,076 A | 4/1999 | Hafner et al. |
| 5,894,554 A | 4/1999 | Lowery et al. |
| 5,897,622 A | 4/1999 | Blinn et al. |
| 5,897,629 A | 4/1999 | Shinagawa et al. |
| 5,899,088 A | 5/1999 | Purdum |
| 5,910,896 A | 6/1999 | Hahn-Carlson |
| 5,918,213 A | 6/1999 | Bernard et al. |
| 5,943,652 A | 8/1999 | Sisley et al. |
| 5,943,841 A | 8/1999 | Wunscher |
| 5,956,709 A | 9/1999 | Xue |
| 5,961,601 A | 10/1999 | Iyengar |
| 5,963,919 A * | 10/1999 | Brinkley et al. ............. 705/28 |
| 5,979,757 A * | 11/1999 | Tracy et al. ................ 235/383 |
| 6,023,683 A | 2/2000 | Johnson et al. |
| 6,061,607 A | 5/2000 | Bradley et al. |
| 6,070,147 A | 5/2000 | Harms et al. |
| 6,073,108 A | 6/2000 | Peterson |
| 6,081,789 A | 6/2000 | Purcell |
| 6,083,279 A | 7/2000 | Cuomo et al. |
| 6,085,170 A | 7/2000 | Tsukuda |
| 6,101,481 A | 8/2000 | Miller |
| 6,140,922 A | 10/2000 | Kakou |
| 6,178,510 B1 | 1/2001 | O'Connor et al. |
| 6,185,625 B1 | 2/2001 | Tso et al. |
| 6,215,952 B1 | 4/2001 | Yoshio et al. |
| 6,233,543 B1 | 5/2001 | Butts et al. |
| 6,249,801 B1 | 6/2001 | Zisapel et al. |
| 6,260,024 B1 | 7/2001 | Shkedy |
| 6,275,812 B1 | 8/2001 | Haq et al. |
| 6,289,260 B1 | 9/2001 | Bradley et al. |
| 6,289,370 B1 | 9/2001 | Panarello et al. |
| 6,292,784 B1 | 9/2001 | Martin et al. |
| 6,324,520 B1 * | 11/2001 | Walker et al. ................ 705/16 |
| 6,332,334 B1 | 12/2001 | Faryabi |
| 6,341,269 B1 | 1/2002 | Dulaney et al. |
| 6,343,275 B1 | 1/2002 | Wong |
| 6,397,246 B1 | 5/2002 | Wolfe |
| 6,405,173 B1 | 6/2002 | Honarvar et al. |
| 6,424,947 B1 | 7/2002 | Tsuria et al. |
| 6,445,976 B1 | 9/2002 | Ostro |
| 6,453,306 B1 | 9/2002 | Quelene |
| 6,463,345 B1 * | 10/2002 | Peachey-Kountz et al. ... 700/99 |
| 6,463,420 B1 | 10/2002 | Guidice et al. |
| 6,490,567 B1 | 12/2002 | Gregory |
| 6,496,205 B1 | 12/2002 | White et al. |
| 6,505,093 B1 | 1/2003 | Thatcher et al. |
| 6,505,171 B1 | 1/2003 | Cohen et al. |
| 6,526,392 B1 | 2/2003 | Dietrich et al. |
| 6,530,518 B1 | 3/2003 | Krichilsky et al. |
| 6,567,786 B1 | 5/2003 | Bibelnieks et al. |
| 6,571,213 B1 | 5/2003 | Altendahl et al. |
| 6,578,005 B1 | 6/2003 | Lesaint et al. |
| 6,598,027 B1 | 7/2003 | Breen, Jr. et al. |
| 6,622,127 B1 | 9/2003 | Klots et al. |
| 6,654,726 B1 | 11/2003 | Hanzek |
| 6,697,964 B1 | 2/2004 | Dodrill et al. |
| 6,741,995 B1 | 5/2004 | Chen et al. |
| 6,748,418 B1 | 6/2004 | Yoshida et al. |
| 6,763,496 B1 | 7/2004 | Hennings et al. |
| 6,862,572 B1 | 3/2005 | de Sylva |
| 6,879,965 B2 | 4/2005 | Fung et al. |
| 6,970,837 B1 * | 11/2005 | Walker et al. ................ 705/26 |
| 6,990,460 B2 | 1/2006 | Parkinson |
| 2001/0037229 A1 | 11/2001 | Jacobs et al. |
| 2001/0042021 A1 | 11/2001 | Matsuo et al. |
| 2001/0047285 A1 | 11/2001 | Borders et al. |
| 2001/0047310 A1 | 11/2001 | Russell |
| 2001/0049619 A1 | 12/2001 | Powell et al. |
| 2001/0049672 A1 | 12/2001 | Moore |
| 2002/0004766 A1 | 1/2002 | White |
| 2002/0007299 A1 | 1/2002 | Florence |
| 2002/0013950 A1 | 1/2002 | Tomsen |
| 2002/0038224 A1 | 3/2002 | Bhadra |
| 2002/0049853 A1 | 4/2002 | Chu et al. |
| 2002/0065700 A1 | 5/2002 | Powell et al. |
| 2002/0188530 A1 | 12/2002 | Wojcik et al. |
| 2002/0194087 A1 | 12/2002 | Splegel et al. |
| 2003/0045340 A1 | 3/2003 | Roberts |
| 2003/0079227 A1 | 4/2003 | Knowles et al. |
| 2003/0233190 A1 | 12/2003 | Jones |
| 2004/0236635 A1 * | 11/2004 | Publicover .................. 705/26 |
| 2005/0027580 A1 | 2/2005 | Cricl et al. |
| 2005/0144641 A1 | 6/2005 | Lewis |

FOREIGN PATENT DOCUMENTS

| | | | |
|---|---|---|---|
| GB | 2 265 032 A | * | 9/1993 |
| WO | WO99/07121 | | 2/1999 |

OTHER PUBLICATIONS

"Estimation of Consumer Demand with Stock-Out Based Substitution: An Application to Vending Machine Product", Anupindi, Ravi; Dada, Maqbool; Gupta, Sachin; Marketing Science; vol. 17, No. 4, 1998, pp. 406-423.*

Automatic ID News, "20/20 Results Achieved with Technology Trio", Sep. 1995, p. 19.

Henry Towie, "On the Fast Track with Totaltracks: UPS Deploys Mobile Date Service," Abstract No., XP-000560076, Document Delivery World, vol. 9, No. 3, 1993, pp. 30-31.

Hiroo Kawata, "Information Technology of Commercial Vehicles in the Japanese Parcel Services Business," Abstract No., XP-000560489, 1992, pp. 371-382.

Koster, Rene de, "Routing Orderpickers in a Warehouse: A Comparison Between Optimal and Heuristic Solutions," IIE Transactions, vol. 30, No. 5, p. 469, May 1998.

Maloney, David, "The New Corner Drugstore", May 1, 2000, Modern Materials Handling, vol. 55, No. 5, p. 58.

PC Foods, "Customer Service Agreement," printed from website: http://www.pcfoods.com, Abstract No., XP-002245026, 1999, pp. 1-2.

Takashi Sekita, "The Physical Distribution Information Network in the Home-Delivery Business," Japan Computer Quarterly, Abstract No., XP-00.431194, 1990, pp. 23-32.

The Impact of Electronic Data Interchange on Competitiveness in Retail Supply Chain, Brian Fynes et al., IBAR v14n2 pp. 16-2 1993.

Van Den Berg, Jeroen, P, "A Literature Survey on Planning and Control of Warehousing Systems", IIE Transactions vol. 31, No. 3, p. 751, Aug. 1999.

Vass et al., "The World Wide Web—Everything you (n)ever wanted to know about its server", IEEE, Oct./Nov. 1998, pp. 33-37.

Wilson, Joe, "Selecting Warehouse Management Software (WMS) for Food Distribution Operations", Frozen Food Digest, Oct. 1998, vol. 14, No. 1, p. 18.

Wunnava et al., "Interactive Multimedia on the World Wide Web", IEEE, Aug. 1999, pp. 110-115.
U.S. Appl. No. 09/568,570, filed May 10, 2000.
U.S. Appl. No. 09/568,571, filed May 10, 2000.
U.S. Appl. No. 09/568,572, filed May 10, 2000.
U.S. Appl. No. 09/568,603, filed May 10, 2000.
U.S. Appl. No. 09/568,613, filed May 10, 2000.
U.S. Appl. No. 09/568,614, filed May 10, 2000.
U.S. Appl. No. 09/568,823, filed May 10, 2000.
U.S. Appl. No. 09/620,199, filed Jul. 20, 2000.
U.S. Appl. No. 09/792,400, filed Feb. 22, 2001.
U.S. Appl. No. 09/813,235, filed Mar. 19, 2001.
Norton, Tim R., "End-To-End Response-Time: Where to Measure?", Computer Measurement Group Conference Proceedings, CMG99 Session 423, Dec. 1999, pp. 1-9.
Hyten, Todd, "Stop & Shop mulls online grocery store", Boston Business Journal (Boston, MA, US), vol. 16, No. 6, p. 1, Mar. 22, 1996.
Pearce, Michael R. "From carts to clicks", Ivey Business Quarterly, vol. 63, No. 1, p. 69-71, Autumn 1998.
"Peapod Interactive Grocery Shopping and Delivery Service Now Delivers Via the Internet", Press Release, peapod.com, Apr. 22, 1996, pp. 1-2.
Worht Wren Jr., Fort Worth Star-Telegram Texas, "Albertson's Expects Online Grocery Shopping To Boom", KRTBN Knight-Ridder Tribune Business News (Fort Worth Star-Telegram, Texas), Nov. 9, 1998.
www.peapod.com, Including Introduction to Peapod; How Peapod Works; Peapod: Choosing a Delivery Time; Peapod: Sending Your Order; Retrieved from Internet Archive (web.archive.org) on Jul. 23, 2006, alleged date Nov. 13, 1996, pp. 1-9.
Fielding et al., "Hypertext Transfer Protocol—HTTP/1.1, RFC 2616", Network Working Group, Jun. 1999, pp. 1-90.

* cited by examiner

| SKU # | SKU DESCRIPTION | RANK | SUBSTITUTE RATIO | SUBSTITUTE SKU # | SUBSTITUTE SKU DESCRIPTION | RULE |
|---|---|---|---|---|---|---|
| 1001 | Budweiser 6 pack | 1 | 0.5 | 1002 | Budweiser 12 pack | Lesser Charge |
|  |  | 2 | 1 | 1005 | Budweiser 2 liter | Lesser Charge |
|  |  | 3 | 1 | 1009 | Miller 6 pack | No charge |
| 2001 | Wheaties 28 Oz. | 1 | 1 | 2002 | Natures Way Organic Wheat Flakes | Lesser Charge |
| 3001 | Lean Ground Beef | 1 | 1 | 3002 | Not so Lean Ground Beef | No charge |
| 4001 | Large Red Apples | 1 | 2 | 4003 | Medium Red Apples | Lesser Charge |
|  |  | 2 | 1 | 4007 | Large McIntosh Apples | No charge |
|  |  | X |  | 4050 | Green Apples | Not allowed |

Fig. 4

TECHNIQUE FOR IMPLEMENTING ITEM SUBSTITUTION FOR UNAVAILABLE ITEMS RELATING TO A CUSTOMER ORDER

CROSS-REFERENCE TO RELATED APPLICATIONS

This application is related to the following patent applications: U.S. patent application Ser. No. 09/568,603 naming Borders et al. as inventors, U.S. patent application Ser. No. 09/568,570, naming Klots et al. as inventors, and U.S. patent application Ser. No. 09/568,569, naming Klots et al. as inventors, all filed on May 10, 2000. Each of the above-referenced U.S. Patent Applications is incorporated herein by reference for all purposes.

BACKGROUND OF THE INVENTION

The present invention pertains to order substitution methods and systems that automatically perform substitutions for unavailable items in a customer order. More specifically, the invention allows for the substitution of unavailable items based upon predetermined criteria and set processes, so that the substitutions are made in a manner that optimizes efficiency and customer satisfaction.

Substitution methods in the current art typically use non-systematic and inefficient procedures in order to provide substitute items for unavailable items in a customer order. For example, some Internet-based grocery shoppers, (such as, for example, Peapod Inc., of Skokie, Ill.), send human buyers to one or more stores in order to fulfill customer orders. If a buyer is trying to fulfill an order for Brand A 64 oz. Ketchup, for example, and it is out of stock at the store, the buyer can make a substitution in order to approximate the product that the customer ordered. However, the substituted item may only be chosen from available items on the grocery shelf, which are typically adjacent to the unavailable items on the shelf space. Thus, for example, the buyer might substitute the same brand ketchup in a different size or variety, or a different brand in a similar size or variety, assuming that either is available at the store.

There are several problems with conventional order substitution methods. For one, the buyer's guess often does not result in a satisfactory substitute, particularly since they buyer is typically not an expert on all types of products. Also, the buyer does not have a procedure by which to consider all of his or her or her customer orders in the aggregate in order to make decisions that better maximize customer satisfaction. Further, no procedures exist for aggregating the orders of one buyer with that of other buyers in order to make larger aggregate decisions. Additionally, the buyer also does not have access to data concerning the available inventory of the store before attempting to fulfill his or her orders, and therefore is only able to make ad hoc decisions at the time of fulfillment.

For these, and other reasons, an efficient, automatic system architecture and method is desired to implement substitutions for unavailable items in customer orders.

SUMMARY OF THE INVENTION

This invention provides systems and methods for implementing item substitutions with respect to consumer orders in order to implement substitutions of unavailable items in customer orders. In a specific embodiment, this is accomplished by first taking customer orders via a data or computer network. A selected number of customer orders may then be aggregated and analyzed in order to make item substitution decisions. The decisions may be based upon a variety of different criteria, including one or more of the following: data from the selected customer orders, customer preferences, predefined substitution rules for each of the products, and accurate inventory information on the actual availability of products, etc.

Specific embodiments of the invention provide a method and computer program product for effecting, via a computer network, substitution of at least one ordered item of at least one customer order. At least one customer order is received via the computer network. At least a portion of the received customer order is analyzed to determine whether at least one item of inventory has been oversold. According to a specific implementation, the analyzed order data may be compared to available inventory data to determine whether at least one item of inventory has been oversold. Order line items relating to an identified oversold item may then be identified, wherein each order line item may be associated with a respective customer order. According to a specific implementation, order line items for identified oversold items may be selected using at least a portion of the predefined criteria. At least one second item may then be substituted for an identified oversold item in selected customer orders, based upon the predefined criteria. According to one implementation, the item substitution technique of the present invention may be performed by an automated computer process. It may also be performed at a time of fulfilling an order without intervention from a human operator.

According to a specific implementation, the predefined criteria may include a variety of business rules relating to how line items are selected for substitution analysis, and relating to how substitute items are selected. For example, the predefined criteria may include rules relating to minimizing a total number of order substitutions performed for each customer order; rules relating to selecting, for substitution analysis, order line items which have a relatively highest order quantity; sorted list of substitute products from which substitute items are chosen; rules for substituting a specific quantity of a second item for an unavailable item; etc.

An alternate embodiment of the present invention is directed to a system for effecting, via a computer network, substitution of at least one ordered item of at least one customer order. The system may include least one central processing unit, at least one interface configured or designed to receive at least one customer order via the computer network, and memory. The at least one customer order may include at least zone order line item relating to an ordered quantity of a particular item of inventory. The memory may be configured to store customer order information and predefined criteria relating to item substitution rules. The system may be configured to analyze at least a portion of the received customer orders to determine whether at least one item of inventory has been oversold. The system may also be configured to identify order line items relating to an identified oversold item, wherein each order line item is associated with a respective customer order. The system may also be configured to substitute, based upon predefined criteria, at least one second item for the identified oversold item in selected customer orders.

Alternate embodiments of the present invention are directed to a method and computer program product for effecting, via a computer network, substitution of at least one ordered item of at least one customer order. At least one customer order is received via the computer network. Each customer order may include at least one order line item relating to an ordered quantity of a particular item of inventory. At least a portion of the received customer orders may then be analyzed to determine whether at least one item of inventory has been oversold. Order line items relating to an identified oversold item may be identified, each order line item being associated with a respective customer order. At least one second item may then be substituted for the identified oversold item in selected customer orders based upon predefined criteria.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 4 shows an example of substitution instructions 400 for specified SKUs in accordance with a specific embodiment of the present invention.

DETAILED DESCRIPTION OF THE PREFERRED EMBODIMENTS

The following discussion presents some terms and concepts pertinent to the operation of a distribution center. The invention is not specifically limited to the examples described hereafter.

Figure 1:
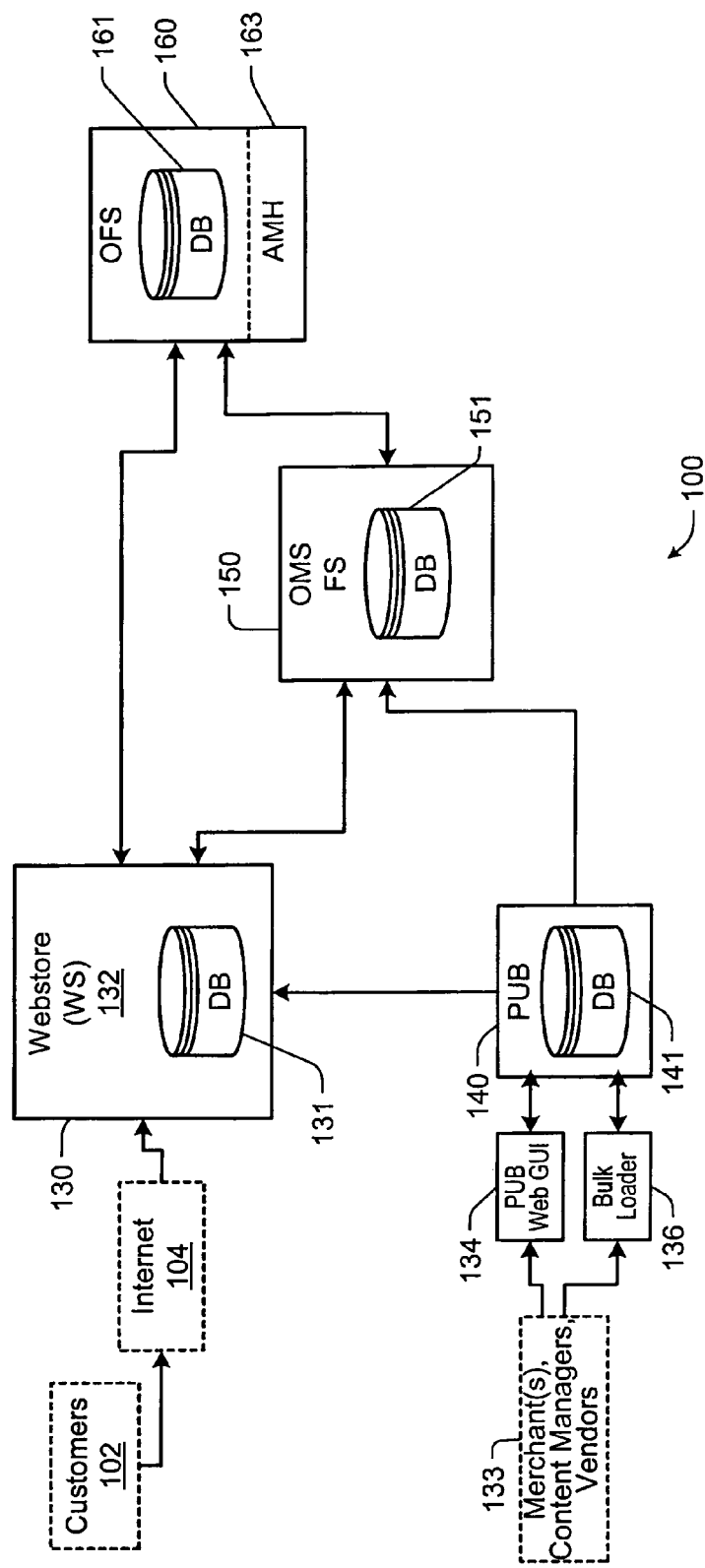
FIG. 1 shows a schematic block diagram showing the most relevant parts of integrated system architecture 100 in accordance with a specific embodiment of the present invention.

FIG. 1 shows a schematic block diagram of a specific embodiment of an integrated system architecture 100 which may be used for implementing the automated substitution technique of the present invention. As shown in FIG. 1, system 100 includes a plurality of subsystems and other components for effecting electronic commerce over a data network. A brief description of at least a portion of the plurality of subsystems of system 100 is presented below.

For example, system 100 of FIG. 1 may include a Publishing (PUB) Subsystem 140 which provides an interface to merchants, vendors and/or content managers 133; a Webstore Subsystem (WS) 132 which manages the on-line store interface with customers, including customer shopping and ordering transactions; an Order Management Subsystem (OMS) 150 which manages pricing data, item availability data, inventory data, vendor data, finance, procurement, etc.; an Order Fulfillment Subsystem (OFS) 160 which facilitates the fulfillment of customer orders; etc. Each of the various subsystems shown in FIG. 1 of the drawings will now be described briefly below.

According to a specific implementation, the PUB Subsystem 140 may be used for managing SKU inventory and catalog information (e.g. SKUs, UPCs, products, categories, descriptive attributes, etc.), and item substitution information provided by merchants or vendors.

"Inventory" is the stock of SKU items actually available for customer orders. Each different item of inventory is associated with a respective stock keeping unit or SKU, regardless of whether the item is available for customer purchase. A "stock keeping unit" or SKU may be defined as a unique identifier that corresponds to a particular consumer item. A type of product, for example, Brand A ketchup, may have several unique SKUs, each corresponding, for example, to different sizes and/or flavors of Brand A ketchup.

Merchants and content managers 133 may enter and maintain SKU information stored in the PUB database using the PUB Web GUI interface 134 and PUB Bulk Loader interface 136. The SKU information may include SKU attribute values such as, for example, UPCs, vendors, categories, category hierarchy, images, articles, descriptive information, etc. The PUB Web GUI interface 134 allows merchants to edit SKU information, products, and/or categories. The PUB Bulk Loader 136 supports the processing of data files from outside the PUB Subsystem into the PUB database 141. According to a specific embodiment, the PUB Bulk Loader is configured to allow merchants to upload a variety of data file types into the PUB database including flat data files, and image files. The Bulk Loader processes the flat file information to create appropriate database records for the PUB catalog.

Periodically (e.g., minutes, hours, days) the OMS polls the PUB database for new and updated SKU information, and stores the retrieved data into the OMS database 151. According to a specific embodiment, OMS maintains available-to-promise (ATP), price, and inventory (e.g., replenishment and purchasing) information for each SKU. OMS may also capture and/or manage sales and shipment data relating to each SKU. Periodically, OMS passes new and updated SKU information it acquires from the PUB Subsystem to the OFS. The SKU information may be used by OFS, for example, to maintain physical inventory and fulfill orders.

According to a specific embodiment, the PUB Subsystem 140 may be used as an interface to allow merchants/vendors to enter substitution instructions relating to specific SKUs. An example of a set of substitution instructions for selected SKUs is shown in FIG. 4 of the drawings.

FIG. 4 shows an example of substitution instructions 400 for specified SKUs in accordance with a specific embodiment of the present invention. As shown in the example of FIG. 4, a set of "substitution instructions" may comprise a plurality of different fields, including, for example, a list of different SKUs 410, a description 411 of each SKU, and corresponding substitution rules 450 associated with each SKU. In the example of FIG. 4, substitution instructions are included for four SKU items, namely "Budweiser 6 pack" 402, "Wheaties 28 oz." 404, "Lean Ground Beef" 406, and "Large Red Apples" 408.

As shown in the embodiment of FIG. 4, substitution rules 450 for each original SKU 410 may include one or more substitute SKUs 417. The substitution rules 450 may also include a ranking preference 412 for each substitute SKU, a substitution ratio 416 to be applied for each respective substitute SKU, a description 418 of each substitute SKU, pricing rules 420 for each substitute SKU, etc. For example the SKU entry 402 corresponding to "Budweiser 6 pack" may be substituted with three alternate SKU items, which have been sorted according to preference, namely, (1) Budweiser 12 pack, (2) Budweiser 2 liter, and (3) Miller 6 pack. The ranking indicates an order of preference, which means that the substitution procedure will attempt to use substitute SKU (1) first, then SKU (2) if SKU (1) is not available, then SKU (3) if neither SKU (1) or SKU (2) are available.

According to a specific implementation, the "substitution rules" for particular SKU indicate how substitutions are to be performed for that SKU. The substitute ratio field 416 may be used to determine how much quantity of a substitute SKU is to be substituted for a specified quantity of an original SKU. According to a specific embodiment, it is preferable to have a substitute ratio included since a substitution may not necessarily be one for one. The "charge rule" or pricing field 420 may be used to determine a price to bill the customer for the substituted item.

For example, if a customer orders a quantity of 1 "Budweiser 6 Pack", and later it is determined that this SKU is oversold or unavailable, the substitution instructions 400 may be referenced in order to determine which products/items may be substituted for the unavailable item. According to the example of FIG. 4, a "Budweiser 12 pack" is the preferred choice for substituting for a "Budweiser 6 Pack." Using the substitution rules shown in (402), a quantity of 0.50 "Budweiser 12 pack" may be substituted for each quantity of 1 "Budweiser 6 pack" item ordered, so that approximately the same amount of actual net weight beer is substituted. However, according to a specific implementation, substitute ratios may be rounded up to the nearest whole integer so that a customer that ordered one "Budweiser 6 pack" item will receive one "Budweiser 12 pack" item and not one-half of a "Budweiser 12 pack" item. If the customer had ordered two "Budweiser 6 pack" items, the customer may still receive only one "Budweiser 12 pack" item as a substitution.

Another aspect relating substitute item processing concerns pricing for substitute items. As shown in FIG. 4, the substitution instructions may include a "charge rule" or pricing field 420, which may be used to determine a price to bill the customer for the substituted item. For example, as shown in row 402 of FIG. 4, where one item of "Budweiser 12 pack" has been substituted for one item of "Budweiser 6 pack," the pricing rule 420 specifies "lesser charge." This means that the customer will be charged the lower of the two prices of either the original SKU or the substitute SKU. Thus, in this example, assuming that the price of a "Budweiser 6 pack." item is less than the price of a "Budweiser 12 pack" item, the customer will be charged for the price of a "Budweiser 6 pack," even if an entire "Budweiser 12 pack" item is substituted for the "Budweiser 6 pack."

A different pricing rule is shown in FIG. 4 as "no charge." This means that a customer will not be charged for a substituted item. For example, as shown in FIG. 4, if the "Miller 6 pack" item is substituted for a "Budweiser 6 pack" item, the customer incurs no charge for the substituted item. Presumably, this pricing may be used as appropriate to achieve desired levels of customer satisfaction.

According to a specific embodiment, the substitution instructions may also include a "not allowed" substitution rule for one or more SKUs. This is shown, for example, in entry 408 of FIG. 4. In this example, the original SKU item is "Large Red Apples", and one of the substitute items listed is "Green Apples", which is indicated by an "X" in the "rank" field 412, indicating that "Green Apples" are not allowed to be substituted for "Large Red Apples." Thus, according to a specific implementation, while any item that is not listed in the substitution list is implicitly not allowed as a substitute SKU, an item may explicitly excluded as a possible substitute for one or more specified SKUs.

It will be appreciated that, in an alternate embodiment, the substitution instructions may be entered by merchants, vendors, or other human operators via the Webstore interface 132, or via other desired system interfaces. Further, according to a specific implementation, the merchant or vendor is able to add, rearrange, and remove items from the substitution list. Additionally, according to a specific embodiment, merchants and/or vendors may be provided with information relating to oversold items. For example, a merchant may be provided with information relating to selected oversold items for customer orders which are to be fulfilled the following day. The merchant is then able to analyze the oversold item information, and submit substitution instructions for the selected oversold items before the customer orders are fulfilled. According to one implementation, the oversold item information may be provided to a merchant via the PUB Subsystem 140.

According to at least one alternate embodiment, substitution instructions may be generated automatically using a general set of business and customer preference rules in order to save time and also optimize customer satisfaction. Preliminary substitution lists may also be generated in the same manner to be approved or edited by merchants. In any of these embodiments, the substitution instructions are typically stored in a database for retrieval at the appropriate point of use. In another embodiment, a substitution list can be dynamically generated at the time of use, again by using a general set of business and customer preference rules.

Webstore Subsystem (WS)

According to a specific implementation, the Webstore Subsystem (WS) 132 provides an interface for enabling customers to access an on-line store (e.g. Webstore), which, for example, may be used to provide a customer with an electronic representation of a retail store. In a specific embodiment where the Webstore may be implemented as a website on the World Wide Web, customers 102 may access the Webstore via the Internet 104 or World Wide Web using any one of a plurality of conventional browsers. The Webstore user interface may be designed to provide a rich set of functions without requiring any special browser plug-ins. Thus, according to a specific embodiment, customers may access the Webstore using any client machine, regardless of the machine's operating system platform. Additionally, for security purposes, the Webstore interface also supports data encryption for exchange of any sensitive or private information between the customers and the website. According to a specific embodiment, the secure Webstore interface may be implemented using a secure http protocol (HTTPS), commonly known to those of ordinary skill in the art.

In accordance with a specific embodiment, the Webstore Subsystem 132 may be configured to support a number of customer related features such as, for example, self registration; accessing of customer account information; browsing of product categories and category hierarchy; viewing of product images and product information; keyword searches; delivery scheduling; accessing of customer order history; customizable shopping lists; on-line shopping and ordering; etc.

The Webstore Subsystem (herein referred to as the Webstore) may be implemented using at least one server which is connected to the data network. According to a specific embodiment, the Webstore may be implemented using a plurality of web servers (e.g. a load-balanced web server farm) which helps to minimize server response time and provide real-time failover and redundancy capabilities. Further, according to a specific embodiment, in order to keep the web server response time to a minimum, the Webstore may be configured such that all processing is performed on a single server, within one process. Where a plurality of Webstore servers are used, redundant processing may be performed by at least a portion of the servers so that a single Webstore server may handle all Webstore processing tasks associated with a particular on-line customer. It will be appreciated that the Webstore server boundaries may be crossed where appropriate, such as, for example, when accessing desired databases via the data network.

Order Management Subsystem (OMS)

The Order Management Subsystem (OMS) 150 manages a variety of aspects related to the integrated system architecture of system 100, including, for example, pricing, availability, inventory, vendors, financials, procurement, and data flows between various subsystems.

As shown in FIG. 1, the OMS subsystem 150 includes at least one database 151 for storing various data received from at least a portion of the other subsystems. According to a specific embodiment, the database 151 is configured to include a plurality of schemas, such as, for example, standard packaged application schemas and/or customized schemas. According to a specific implementation, the OMS database is configured as a single Oracle database running on a Sun Solaris server.

According to a specific implementation, OMS batch processing may be controlled using a process scheduler. The process scheduler is able to manage the number of concurrent processes being run and the date/time at which certain processes are to run or be executed. The process scheduler may also enable central visibility of all processes currently running. Batch processing and reporting may be accomplished using a variety of different technologies commonly known to one having ordinary skill in the art.

The Order Management Subsystem may be configured to support both asynchronous and synchronous interfaces with the other subsystems. In a specific embodiment, the OMS is configured to support an asynchronous interface with each of the other subsystems. Additionally, each OMS interface is configurable, and may be configured to support the running of batch processes as often as is desirable.

Implementation of the various interfaces between OMS and the other subsystems may be accomplished using a variety of different techniques commonly known to one having ordinary skill in the art. The following description provides an example of at least some of the various techniques which may be used for interfacing OMS with the other subsystems. However, it will be appreciated that the specific interfaces described below may be implemented using other techniques commonly known to those of ordinary skill in the art.

The interface between the OMS and the Webstore Subsystem may be implemented, for example, using a plurality of executable programs. A first portion of the executable programs may be responsible for moving data from the Webstore to the OMS. This data may include, for example, new/updated customer data, new/updated order data, order cutoff information, order billing information, customer return information, customer credits and fees (e.g. bill adjustment data), etc. A second portion of the executable programs is responsible for moving data from the OMS to the Webstore Subsystem. This data may include, for example, inventory data, availability data, pricing data, and information about shipped customer orders.

Order Fulfillment Subsystem (OFS)

The Order Fulfillment Subsystem 160 manages all functionality of the distribution center (DC). In the embodiment of FIG. 1, the OFS includes appropriate hardware and/or software for managing the DC, including, for example, a warehouse management system (e.g. application software), at least one database 161, an automated material handling (AMH) controller component 163 (which manages conveyor, carousel, and scanner components), etc.

In a specific implementation, the Order Fulfillment Subsystem 160 may be implemented using a warehouse management system such as, for example, the MOVE warehouse management system provided by Optum, Inc. of Costa Mesa, Calif. The warehouse system also provides an interface with the Order Management Subsystem. In a specific embodiment, this interface may be implemented using a business host interface (BHI). The warehouse management subsystem may also provide the interface for allowing the OMS subsystem to communicate with the OFS database 161.

The description is only a partial description of an architecture that is suitable for practicing the current invention, with emphasis on the subsystems that are most directly involved in the substitution procedure of the current invention. For a more complete description of such an architecture, see U.S. patent application Ser. No. 09/568,603.

It will be appreciated that other embodiments of the system of FIG. 1 may be used for implementing the technique of the present invention. For example, entire subsystems or selected features or components of the WS Subsystem 132, OMS Subsystem 150, PUB Subsystem 140, and/or OFS Subsystem 160 may be eliminated (if desired) or incorporated into other subsystems of the system of FIG. 1. Such modifications will be apparent to one having ordinary skill in the art. In a specific embodiment, it is preferable that the system 100 include at least a Webstore Subsystem (for receiving customer orders and maintaining inventory records), and an Order Fulfillment Subsystem (for fulfilling customer orders).

Figure 2:
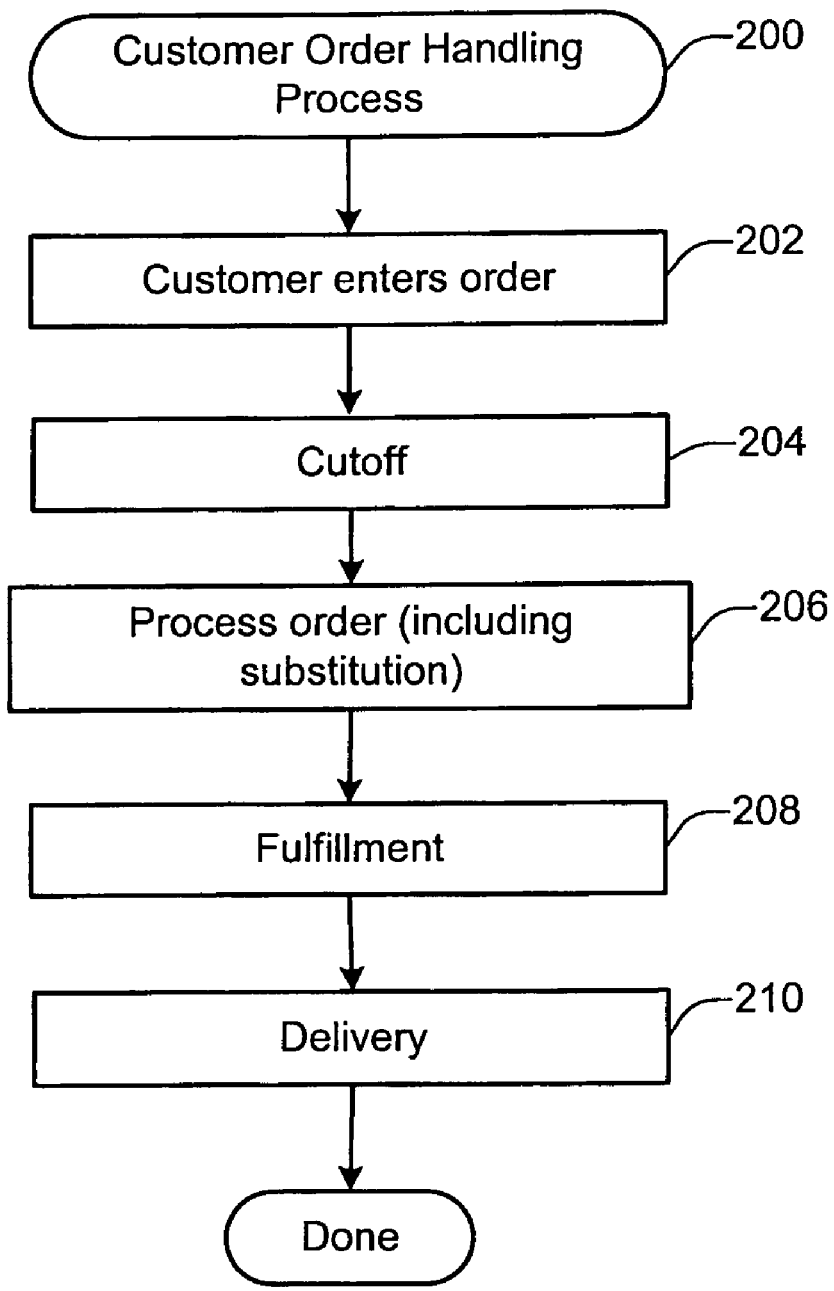
FIG. 2 shows a flow diagram of a Customer Order Handling Process 200 in accordance with a specific embodiment of the present invention.

FIG. 2 shows a flow diagram of a Customer Order Handling Process 200 in accordance with a specific embodiment of the present invention. The Customer Order Handling Process of FIG. 2 depicts a simplified overview of the various processes by which customer orders are taken, the customer orders are processed (including substitutions), and the customer orders are fulfilled and delivered in accordance with a specific embodiment of the present invention.

At 202, a customer enters his or her customer order via the Webstore 132 interface (described above). According to a specific embodiment, a "customer order" includes a list of SKU items that have been ordered, their associated quantities, and other relevant information (e.g., payment information, delivery time information, etc.)

The customer order may include one or more "line item orders," where each line item order corresponds to a particular SKU and includes a desired quantity of the ordered SKU. According to a specific embodiments, at the time of the customer order, the customer may also specify whether substitutions are allowed for the customer order generally, or alternatively, whether substitutions are allowed with respect to each specific line item order. The customer's general substitution preferences also may be stored in the Webstore database, and may be accessed and/or modified during the current customer order.

According to a specific embodiment, during the customer ordering process, customers will be provided information relating to availability of items. For example, customers may be provided with information relating to particular items which will not be available until after the customer's specified delivery date. In this way, item substitution of customer orders may be minimized.

However, for various reasons, it is possible that ordered items may be oversold or unavailable at the time of fulfillment of the order. For example, it is possible that the quantities of inventory levels for selected SKUs that are anticipated or expected to be available by a specific date are not actually available on that date. If it is not possible to fulfill a customer order because one or more ordered items are unavailable, that order may be said to be incomplete.

Incompletes may occur for a variety of reasons, such as, for example, vendor short shipments, goods found damaged at time of fulfillment, etc. For incompletes which relate to short shelf-life SKUs, such as, for example, bread and milk, it may be preferable, from a customer perspective, to substitute items, rather than to allow the order to be delivered incomplete.

Thus it will be appreciated that, substitution capability provides an opportunity to turn a problem into an improved customer experience. For example, customers may receive larger sizes at the smaller size price, may receive premium brands at non-premium brand prices, or may receive comparable brands at no charge.

Returning to FIG. 2, at a designated time after a customer order has been placed, a "cutoff" time occurs (204), at which point the customer is no longer able to modify the order. The customer order is then sent along with other "cutoff" customer orders to be processed (206). The processing of a customer order is generally described in U.S. patent application Ser. No. 09/568,603, previously incorporated herein by reference. According to a specific embodiment, the processing of a customer order includes performing item substitution analysis, which is generally described in FIGS. 3-7 of the drawings. In one implementation, order processing may be implemented at the Webstore Subsystem 132. In alternate embodiments, the order processing may be implemented at any desired subsystem which has been configured to handle the various tasks associated with the processing of customer orders. After the customer order has been processed, the customer order is then fulfilled (208) by obtaining the appropriate items from a warehouse, distribution center, or other locations. Once the order has been fulfilled, it may then be delivered (210) to the customer.

Figure 3:
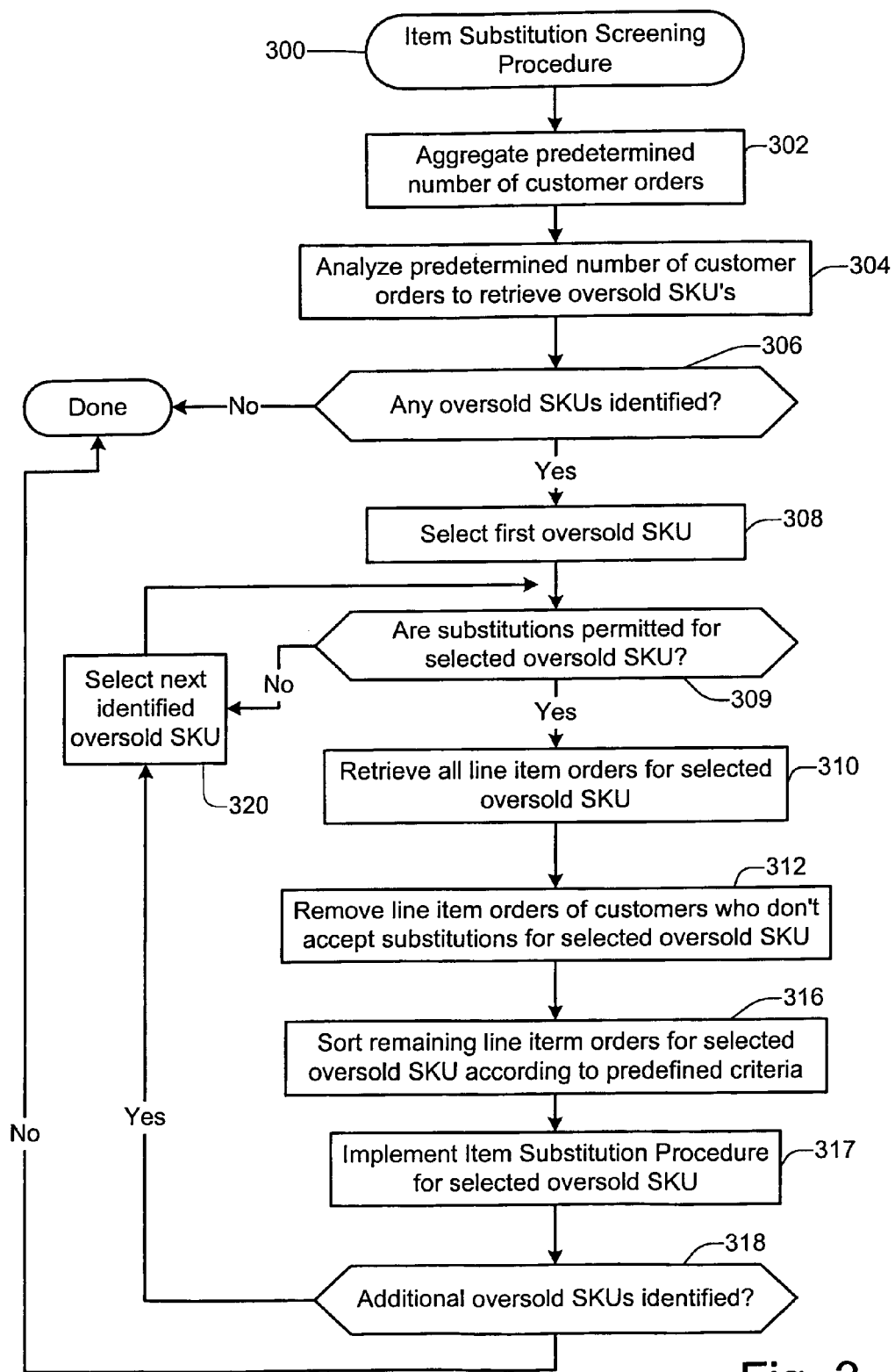
FIG. 3 shows a flow diagram of a Substitution Screening Procedure 300 in accordance with a specific embodiment of the present invention.

FIG. 3 shows a flow diagram depicting an Item Substitution Screening Procedure (300) in accordance with a specific embodiment of the present invention. According to one embodiment, the Item Substitution Screening Procedure may be initiated during the order processing operations described, for example, at 206 of FIG. 2. According to a specific implementation, as shown, for example, in FIG. 3, the Item Substitution Screening Procedure may be configured to analyze customer orders and to generate sorted line item orders of oversold items.

In the example of FIG. 3, it is assumed that order processing has been initiated for a batch of "cutoff" customer orders. As shown at 302 of FIG. 3, all or a selected portion of the cutoff customer orders are aggregated (302) so that they may be processed collectively by the Item Substitution Screening Procedure. The selected customer orders are then analyzed (304) to determine whether any of the SKUs relating to the customer orders (herein referred to as "original SKUs") have been oversold. According to a specific embodiment, the quantity of oversold units for a particular SKU may be determined by comparing a total quantity of ordered units of that SKU (derived from the aggregated customer orders) to the quantity of available units of that SKU in the inventory. If the ordered quantity is greater than the available inventory quantity, it may be determined that the SKU has-been-oversold, wherein the "oversold quantity" may be represented as the difference between the ordered quantity and the available inventory quantity.

According to a specific embodiment, the quantity of available SKU units may be represented as a quantity of SKU units which are estimated to be available as of a specified date, such as, for example, the customer delivery date. According to a specific implementation, each of the customer orders in a given batch of cutoff customer orders will have the same delivery date.

Further, according to a specific embodiment, only SKUs that have associated "substitution instructions" will be analyzed for substitution analysis. As described previously, the system of the present invention may include a respective set of substitution instructions for each or selected SKUs in the inventory. These instructions may either be statically generated (e.g. created by a human operator) or dynamically generated (e.g. created by a computer system using predetermined business rules). An example of a set of substitution instructions for selected SKUs is shown in FIG. 4 of the drawings (described previously).

At 306, a determination is made as to whether there are any oversold SKUs identified. If at least one oversold SKU has been identified, then a first oversold SKU is selected (308) for substitution analysis. A determination is then made (309) as to whether substitutions are permitted for the selected oversold SKU. For example, if there are no substitution instructions for the selected oversold SKU, or if there are no substitute SKUs listed in the substitution instructions for the selected oversold SKU, then, according to at least one embodiment, substitutions are not permitted for the oversold SKU. Alternatively, the substitution instructions may specify that substitutions are not permitted for the oversold SKU. This may occur, for example, with respect to restricted SKU items such as alcohol or tobacco products.

If it is determined that substitutions are not permitted for the selected oversold SKU, then a next identified oversold SKU is selected (320) for substitution analysis. Assuming, however, that substitutions are permitted for the selected oversold SKU, line item orders (from the batch of cutoff customer orders) which correspond to the selected oversold SKU are then retrieved (310). According to a specific implementation, retrieved line item orders which correspond to customers who have requested not to received substitutions (either for the selected oversold SKU or generally) may be discarded (312) so that these line item orders are not considered for further substitution analysis. The remaining line item orders may then continue to be processed (314) for substitution analysis. The remaining line item orders may then be sorted (316) according to predefined criteria.

According to a specific embodiment, the predefined criteria may include business rules which define substitution preferences. Some of these business rules include the substitution instructions described previously with respect to FIG. 4. Other business rules may define substitution preferences based on other criteria, such as, for example: move line item orders that correspond to customer orders which already have at least one substituted item to the bottom of the list (thereby reducing the possibility of having multiple substitutions in a single customer order), substitute higher quantity line item orders first (thereby helping to reduce the total number of customer orders which include substituted items), and other rules designed to maximize customer satisfaction.

Additionally, according to a specific implementation, business rules may be included which prevent an oversold SKU and the substitute SKU from having different regulation codes (e.g. alcohol, tobacco, etc.). Additionally, business rules may be included which do not attempt to substitute a particular SKU for an oversold SKU if it is determined that the substitute SKU already exists as a line item in the customer order. Such business rules may be applied, for example, during substitute SKU selection as described, for example, with respect to FIG. 5 of the drawings.

Once the selected line item orders have been sorted, an Item Substitution Procedure (such as that shown, for example, in FIG. 5 of the drawings) may then be implemented (317) in order to perform the actual substitution for the selected oversold SKU. After the desired substitutions have been performed for the selected oversold SKU, a determination is then made (318) as to whether there are any additional oversold SKUs to be analyzed for substitution. If so, the Item Substitution Screening Procedure may then select (320) a next identified oversold SKU for substitution processing.

Figure 5:
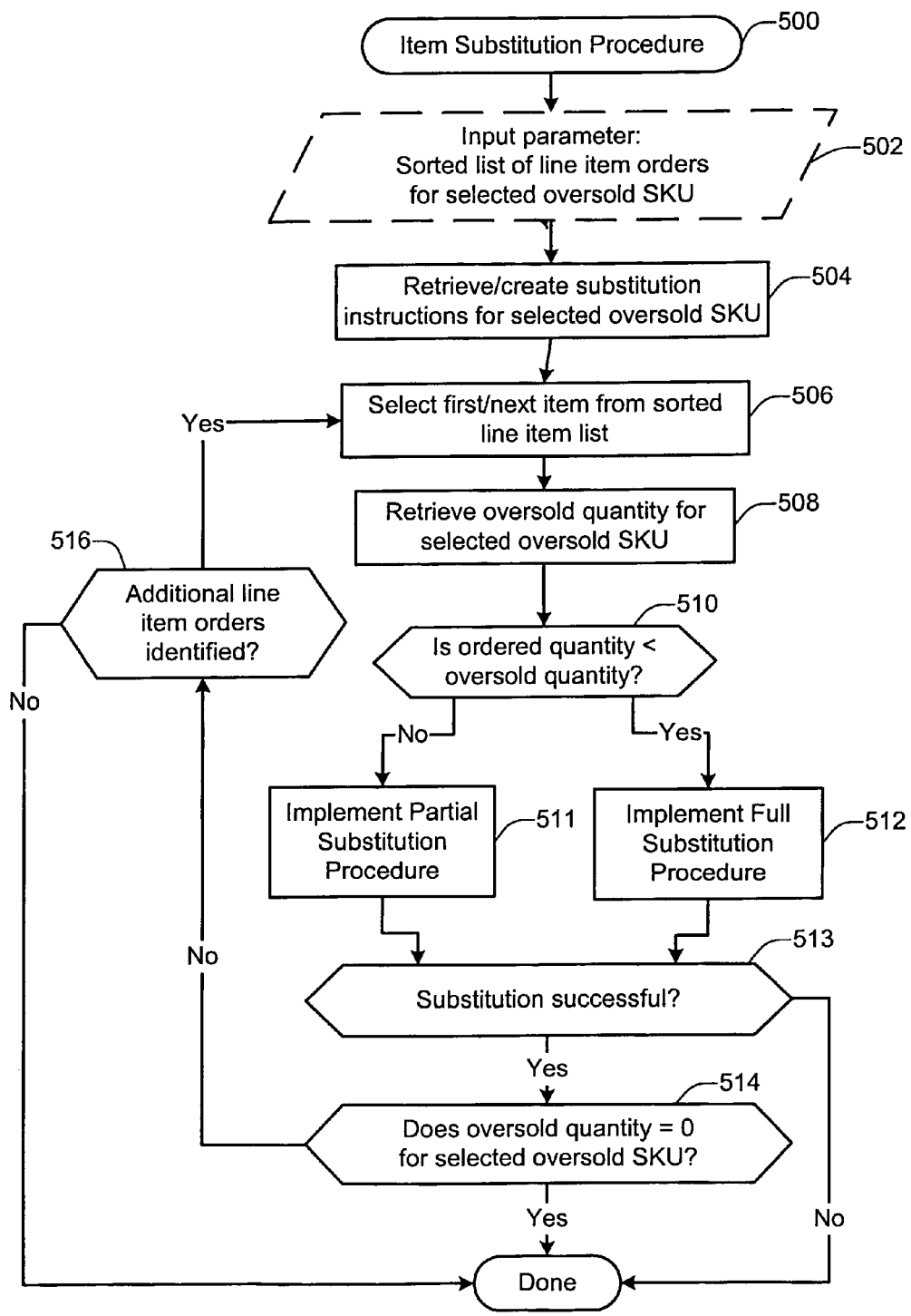
FIG. 5 shows a flow diagram depicting an Item Substitution Procedure 500 in accordance with a specific embodiment of the present invention.

FIG. 5 shows a flow diagram depicting an Item Substitution Procedure 500 in accordance with a specific embodiment of the present invention. According to a specific embodiment, the Item Substitution Procedure (500) may be used to implement SKU substitutions for selected oversold SKUs.

Initially, as shown in the embodiment of FIG. 5, the Item Substitution Procedure may receive (502) one or more input parameters. In the example of FIG. 5, the input parameters include a sorted list of line item orders for a selected oversold SKU, which may be generated, for example, during the Item Substitution Screening Procedure of FIG. 3.

Assuming that the selected oversold SKU has been identified, the Item Substitution Procedure may then retrieve (504) the substitution instructions and other business rules (if any) relating to the identified oversold SKU. Alternatively, according to an alternate embodiment, the substitution instructions may be dynamically generated using predefined business rules specifically configured for generating substitution instructions or rules relating to specific SKUs or classes of SKUs.

As shown at 506 of FIG. 5, a first line item order from the line item list is selected (506) for item substitution analysis. The current oversold quantity for the identified oversold SKU is also retrieved (508). As described in greater detail below, the current quantity of the identified oversold SKU may periodically be updated during the Item Substitution Procedure as orders for the oversold SKU are replaced by substitute SKUs.

As shown at 508, the current oversold quantity is then compared (510) to the ordered quantity specified in the selected line item order. If it is determined that the ordered quantity is less than or equal to the current oversold quantity then a Full Substitution Procedure (such as that described, for example, in FIG. 6 of the drawings) may be implemented (511) for the selected line item order. If it is determined that the ordered quantity is greater than the current oversold quantity, then a Partial Substitution Procedure (such as that described, for example, in FIG. 7 of the drawings) may be implemented (512) for the selected line item order.

For example, if the current line item order specifies a quantity of 3 Large Red Apples, and the current oversold quantity of Large Red Apples is 4, then a full substitution procedure may be implemented, meaning that the full quantity of the line item order (e.g. 3) may be substituted. Once the substitution has been performed for the selected line item order, the current oversold quantity will be updated to 1 oversold large red apple. Alternatively, if the current line item order specifies a quantity of 3 Large Red Apples, and the current oversold quantity of Large Red Apples is 2, then a partial substitution procedure may be implemented, meaning that only a portion the line item order is to be substituted. In this example, the line item order may be filled by allocating 1 large red apple to the customer order, and substituting 2 Large Red Apples with other items.

After the appropriate substitution procedure has been be implemented for the selected line item order, a determination is then made (513) as to whether the substitution for the selected line item order was successful. If it is determined that the substitution was not successful, then, according to one embodiment, it may be assumed that no substitutions are available for the selected oversold product. Accordingly, the Item Substitution Procedure may end without attempting to perform any further substitutions for the selected oversold SKU.

Assuming, however, that the substitution for the selected line item order was successful, a determination is then made (514) as to whether the current oversold quantity for the identified oversold SKU is equal to zero. If it is determined that the current oversold quantity for the identified oversold SKU is equal to zero, then no further substitutions need be performed for the identified oversold SKU. If, however, the current oversold quantity for the identified oversold SKU is greater than zero, a determination may be made (516) as to whether there are additional line item orders (from the sorted list of line item orders) to be analyzed for item substitution analysis. If so, then a next line item order from the list is selected (506) for item substitution analysis.

Figure 6:
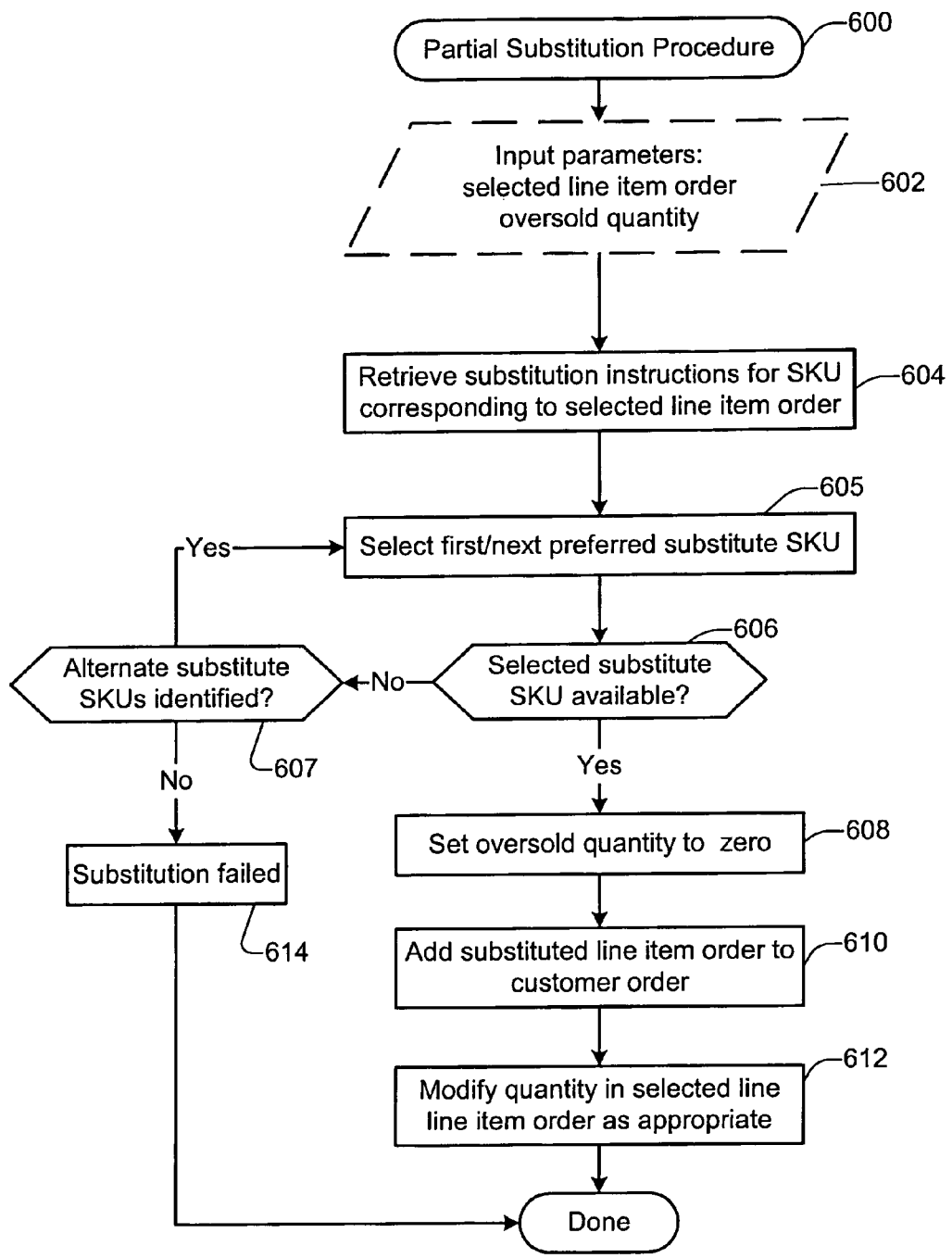
FIG. 6 shows a flow diagram depicting a Partial Substitution Procedure 600 in accordance with a specific embodiment of the present invention.

FIG. 6 shows a flow diagram depicting a Partial Substitution Procedure 600 in accordance with a specific embodiment of the present invention. According to one embodiment, the Partial Substitution Procedure (600) may be implemented for a specified line item order in order to substitute a portion of the ordered quantity of the oversold SKU associated with that particular line item order.

Initially, as shown in the embodiment of FIG. 6, the Partial Substitution Procedure may receive (602) one or more input parameters. In the example of FIG. 6, the input parameters include a selected line item order for a selected oversold SKU, and an oversold quantity for the selected oversold SKU.

Once the selected oversold SKU has been identified, substitution instructions relating to the identified oversold SKU are retrieved (604) and processed in order to select (605) a first preferred substitute SKU for the identified oversold SKU. An example of substitution instructions is shown in FIG. 4 of the drawings.

At 606 a determination is made as to whether there is a sufficient available quantity of the selected substitute SKU to be substituted for the identified oversold SKU. If it is determined that there is an insufficient quantity of the selected substitute SKU available, then the substitution instructions may be consulted to determine (607) whether any alternate substitute SKUs are specified for the identified oversold SKU. Assuming that at least one alternate substitute SKU is specified, a next preferred substitute SKU is selected (605) for analysis. If it is determined that none of the substitute SKU(s) specified in the substitution instructions are available to be substituted for the identified oversold SKU, then, according to a specific implementation, the substitution may be reported (614) as being unsuccessful, and no substitution will be made for the identified oversold SKU.

Assuming that sufficient quantities of a selected substitute SKU are available to be substituted for the identified the oversold SKU quantity, then the partial substitution may be performed, for example, by adding (610) a "substitute line item order" to the customer order, specifying the substitute SKU and substituted quantity, and by reducing or modifying (612) the quantity in the selected line item of the customer order (corresponding to the identified oversold SKU) as appropriate. Additionally, the oversold quantity may be set (608) to zero, thereby indicating that the identified oversold SKU is no longer oversold.

For purposes of illustration, an example of the Partial Substitution Procedure will now be described using the substitution instructions illustrated in FIG. 4 of the drawings. In this example, it is assumed that the selected line item order specifies a quantity of 3 Large Red Apples, and that the current oversold quantity of Large Red Apples is equal to 2. Using the substitution list entry 408 of FIG. 4, a first preferred substitute item for "Large Red Apples" (SKU# 4001) is "Medium Red Apples" (SKU# 4003). Thus, the Partial Substitution Procedure will first check to see if there is a sufficient quantity of Medium Red Apples available to be substituted for the Large Red Apples. In this example, since the oversold quantity of Large Red Apples is equal to 2, only 2 of the 3 ordered Large Red Apples (of the customer's line item order) need be substituted. This may be referred to as a "partial substitution." Additionally, as shown in FIG. 4, the substitute ratio of Medium Red Apples to Large Red Apples is 2:1, meaning that a total of four (4) Medium Red Apples will be required as a substitution for 2 Large Red Apples. Accordingly, the Partial Substitution Procedure checks to see whether 4 Medium Red Apples are available to be allocated.

If it is determined that 4 Medium Red Apples are available, a new line item specifying 4 Medium Red Apples will be added to the customer order (associated with the selected line item order). According to a specific embodiment, the new line item may be described as a partial substitution for the line item order of 3 Large Red Apples. Additionally, the quantity of the customer's (original) line item order for 3 Large Red Apples will be reduced to 1 Large Red Apples, and the quantity of oversold Large Red Apples will be reduced to zero.

Alternatively, if it is determined that no Medium Red Apples are available, a next preferred substitute SKU is selected (if available) for analysis. In the example of FIG. 4, the next preferred substitute item for Large Red Apples is Large McIntosh Apples (SKU# 4007). Accordingly, the Partial Substitution Procedure will check to see whether 2 Large McIntosh Apples are available to be allocated to the identified customer order. If so, then the 2 Large McIntosh Apples will be substituted for 2 of the 3 Large Red Apples ordered in the identified customer order, thereby resulting in a partial substitution.

Figure 7:
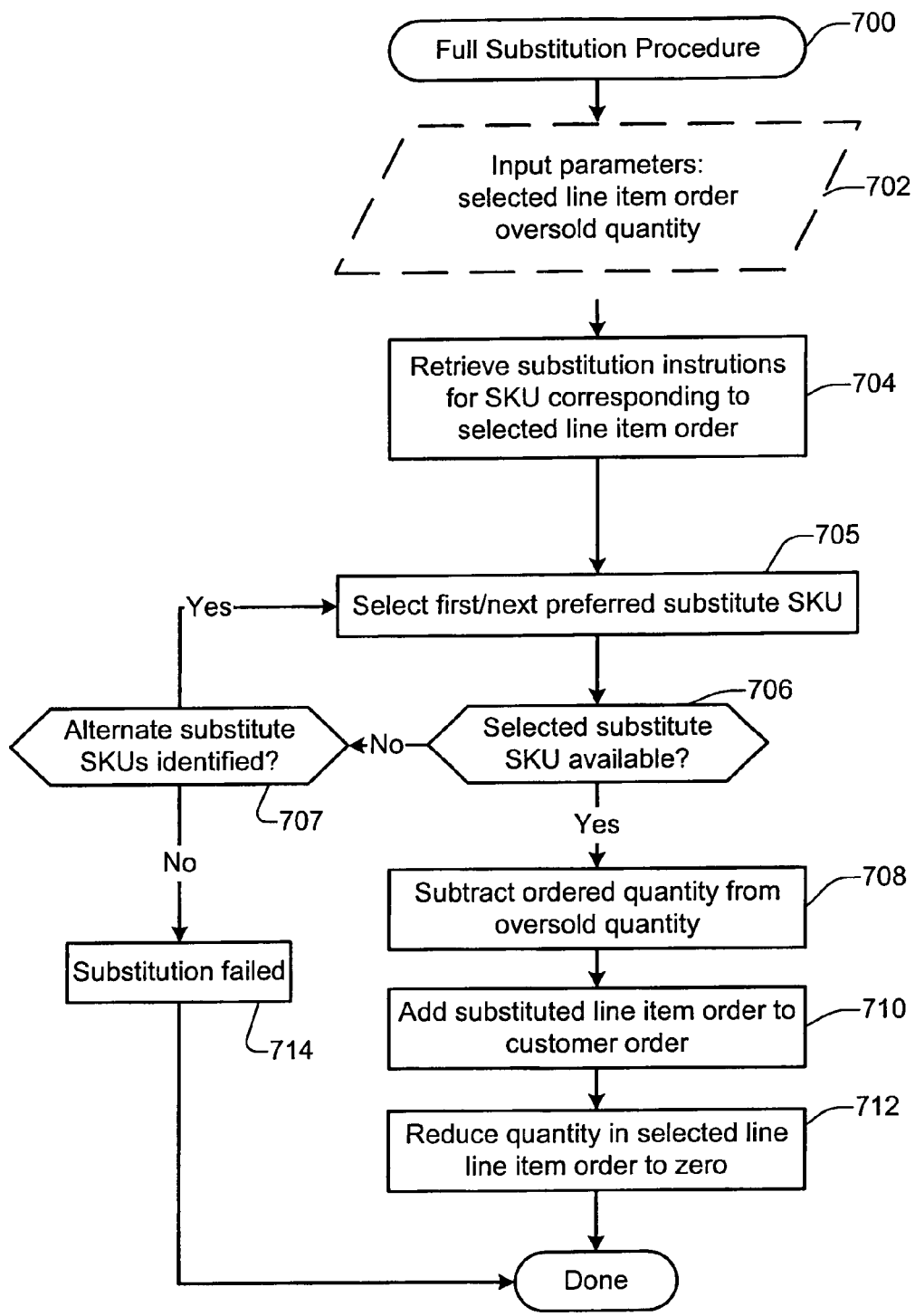
FIG. 7 shows a flow diagram depicting a Full Substitution Procedure 700 in accordance with a specific embodiment of the present invention.

FIG. 7 shows a flow diagram depicting a Full Substitution Procedure 700 in accordance with a specific embodiment of the present invention. According to one embodiment, the Full Substitution Procedure (700) may be implemented for a specified line item order in order to substitute the ordered quantity of the oversold SKU associated with that particular line item order.

Initially, as shown in the embodiment of FIG. 7, the Full Substitution Procedure may receive (702) one or more input parameters. In the example of FIG. 7, the input parameters include a selected line item order for a selected oversold SKU, and an oversold quantity for the selected oversold SKU.

Once the selected oversold SKU has been identified, substitution instructions relating to the identified oversold SKU are retrieved (704) and processed in order to select (705) a first preferred substitute SKU for the identified oversold SKU. An example of substitution instructions is shown in FIG. 4 of the drawings.

At 706 a determination is made as to whether there is a sufficient available quantity of the selected substitute SKU to be substituted for the identified oversold SKU. If it is determined that there is an insufficient quantity of the selected substitute SKU available, then the substitution instructions may be consulted to determine (707) whether any alternate substitute SKUs are specified for the identified oversold SKU. Assuming that at least one alternate substitute SKU is specified, a next preferred substitute SKU is selected (705) for analysis. If it is determined that none of the substitute SKU(s) specified in the substitution instructions are available to be substituted for the identified oversold SKU, then, according to a specific implementation, the substitution may be reported (714) as being unsuccessful, and no substitution will be made for the identified oversold SKU.

Assuming that sufficient quantities of a selected substitute SKU are available to be substituted for the identified the oversold SKU quantity, then the full substitution may be performed, for example, by adding (710) a "substitute line item order" to the customer order, specifying the substitute SKU and substituted quantity, and by reducing or modifying (712) the quantity in the selected line item of the customer order (corresponding to the identified oversold SKU) to zero. In an alternate embodiment, the original line item order may be dropped from the customer order. Additionally, as shown in FIG. 7, the oversold quantity may be modified (708) or adjusted to reflect a new value which takes into account the number of oversold SKU items being substituted in the currently selected line item order.

For purposes of illustration, an example of the Full Substitution Procedure will now be described using the substitution instructions illustrated in FIG. 4 of the drawings. In this example, it is assumed that the selected line item order specifies a quantity of 3 Large Red Apples, and that the current oversold quantity of Large Red Apples is equal to 5. Using the substitution list entry 408 of FIG. 4, a first preferred substitute item for "Large Red Apples" (SKU# 4001) is "Medium Red Apples" (SKU# 4003). Thus, the Full Substitution Procedure will first check to see if there is a sufficient quantity of Medium Red Apples available to be substituted for the Large Red Apples. In this example, since the quantity of the selected line item order for Large Red Apples is equal to 3, a total of six (6) Medium Red Apples will be required as a substitution for 3 Large Red Apples. Accordingly, the Full Substitution Procedure checks to see whether 6 Medium Red Apples are available to be allocated.

If it is determined that 6 Medium Red Apples are available, a new line item specifying 6 Medium Red Apples will be added to the customer order (associated with the selected line item order). According to a specific embodiment, the new line item may be described as a full substitution for the line item order of 3 Large Red Apples. Additionally, the quantity of the customer's (original) line item order for 3 Large Red Apples will be reduced to zero Large Red Apples. Further the quantity of oversold Large Red Apples will be reduced by 3, making the new (or current) oversold quantity of Large Red Apples equal to 2.

The substitution technique of the present invention offers many advantages and capabilities over the conventional techniques. For example, technique of the present invention may be used to minimize the total number of substitutions to be implemented for a selected batch of customer orders by first implementing substitutions for line item orders of higher quantities. In addition, technique of the present invention may automatically prioritize line item orders so that customer orders that have already had at least one item substitution performed are less likely to have another item substitution performed. It will be appreciated that either of the above-described features may result in improved customer satisfaction.

Additionally, according to at least one embodiment of the present invention, substitution of ordered customer items may be automatically implemented without involving human decisions and/or human interactions at the time of fulfillment of the customer order(s). In this way, the technique of the present invention may be used to expedite order processing and order fulfillment, for example, by eliminating delays associated with human decisions and/or interactions.

Moreover, the technique of the present invention is highly scalable, and provides for more consistent and reliable substitutions as compared to conventional techniques. This, in turn, may result in improved overall quality control.

OTHER EMBODIMENTS

Generally, the item substitution technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the item substitution technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. A general architecture for some of these machines will appear from the description given below. In an alternative embodiment, the item substitution technique of this invention may be implemented on a general-purpose network host machine such as a personal computer or workstation. Further, the invention may be at least partially implemented on a card (e.g., an interface card) for a network device or a general-purpose computing device.

Figure 8:
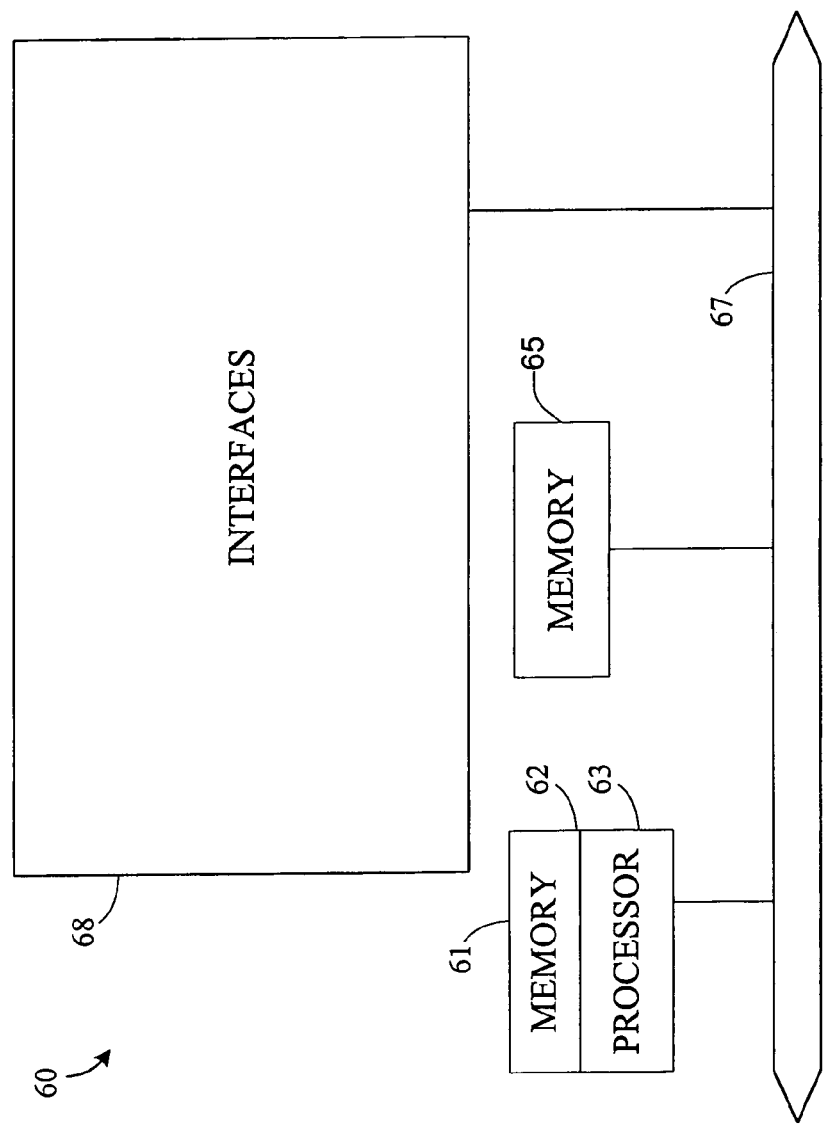
FIG. 8 is schematic illustration of hardware that is suitable for implementing the technique of the present invention.

Referring now to FIG. 8, a network device 60 suitable for implementing the item substitution technique of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a load balancing device, the CPU 62 may be responsible for analyzing packets, encapsulating packets, forwarding packets to appropriate network devices, performing content and/or format verification of data, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the item substitution technique described herein. The program instructions may control the operation of an operating system and/or one or more applications, for example. The memory or memories may also be configured to include data structures which store customer order information, inventory data, item substitution instructions, substitution business rules, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although certain preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A computer-implemented method for effecting, via a computer network, substitution of at least one ordered item of at least one customer order for on-line shopping, the method comprising:

receiving, via the computer network at least one customer order placed by a customer through a computing device, the at least one customer order including more than one ordered item, with at least one ordered item having an ordered quantity larger than one, the customer order being a current order of the customer, including delivery time information regarding the order;

analyzing a selected portion of the received customer order taking into consideration at least another customer order to determine whether at least one item of inventory has been oversold, said analyzing being performed prior to the delivery of at least one ordered item of the received customer order and at least one ordered item of the at least another customer order;

identifying an ordered item in the received customer order relating to an oversold item; and upon identifying the ordered item relating to the oversold item, automatically substituting, based upon information regarding at least one substitution preference stored in a storage medium, at least one substitute item for the identified ordered item in the received customer order, the at least one substitution preference being provided by the customer, wherein the substituting depends on a ratio rule for substituting the substitute item for the identified ordered item, wherein a quantity of the substitute item to be substituted for a quantity of the identified ordered item is not one for one, and is dependent on applying the ratio rule to the quantity of the identified ordered item, wherein the customer is allowed to modify the at least one substitution preference during the current order, and wherein the customer is allowed to view the image of at least one item through the computing device to support the customer in placing the current order.

2. The method of claim 1 wherein said analyzing includes comparing analyzed order data to inventory data to determine whether at least one item of inventory has been oversold.

3. The method of claim 2 wherein said comparing occurs before fulfillment of said portion of the received customer order.

4. The method of claim 1 wherein said substituting includes selecting a desired ordered item corresponding to the oversold item.

5. The method of claim 1 wherein automatically substituting also depends on minimizing the number of order substitutions to be performed for each customer order.

6. The method of claim 1 wherein automatically substituting also depends on selecting for substitution an ordered item over another ordered item based on the corresponding quantity levels of the ordered item and the another ordered item.

7. The method of claim 1 wherein the ordered item substitution occurs at a time of fulfillment of said portion of the received customer order.

8. The method of claim 7 wherein the ordered item substitution is performed at a time of fulfilling an order without intervention from a human operator.

9. The method of claim 1 wherein the ordered item substitution is performed by an automated computer process.

10. The method claim 1 wherein automatically substituting also depends on a sorted list of substitute products from which the substitute item is chosen.

11. A computer-implemented method as recited in claim 1, wherein the at least one substitution preference is a general substitution preference of the customer.

12. The method of claim 1 further comprising comparing the identified ordered item with at least another identified ordered item in another customer order related to the oversold item based upon the quantity associated with each of the identified ordered items.

13. The method of claim 1 further comprising comparing the identified ordered item with at least another identified ordered item in another customer order related to the oversold item based upon a number related to substitution already implemented in each customer order associated with the identified ordered item.

14. The method of claim 1 wherein said analyzing includes aggregating a selected portion of the received customer orders to determine whether at least one item of inventory has been oversold.

15. A computer-implemented method as recited in claim 1, wherein the at least one substitution preference is a specific substitution preference of the customer regarding an item.

16. A computer-implemented method as recited in claim 1, wherein the at least one substitution preference is previously provided by the customer before the current order.

17. A computer program product for effecting, via a computer network, substitution of at least one ordered item of at least one customer order for on-line shopping, the computer program product comprising:

a computer usable medium having computer readable code embodied therein, the computer readable code comprising:

computer code for receiving, via the computer network, at least one customer order placed by a customer through a computing device, the at least one customer order including more than one ordered item, with at least one ordered item having an ordered quantity larger than one the customer order being a current order of the customer, including delivery time information regarding the order;

computer code for analyzing at least a portion of the received customer order taking into consideration at least another customer order to determine whether at least one item of inventory has been oversold, said analyzing being performed prior to the delivery of at least one ordered item of the received customer order and at least one ordered item of the at least another customer order;

computer code for identifying an ordered item in the received customer order relating to an oversold item; and computer code for automatically substituting, based upon information regarding at least one substitution preference stored in a storage medium, at least one substitute item for the identified ordered item in the received customer order upon identifying the ordered item relating to the oversold item, the at least one substitution preference being provided by the customer, wherein the substituting depends on a ratio rule for substituting the substitute item for the identified ordered item, wherein a quantity of the substitute item to be substituted for a quantity of the identified ordered item is not one for one, and is dependent on applying the ratio rule to the quantity of the identified ordered item, wherein the customer is allowed to modify the at least one substitution preference during the current order, and wherein the customer is allowed to view the image of at least one item through the computing device to support the customer in placing the current order.

18. The computer program product of claim 17 wherein automatically substituting also depends on minimizing the number of order substitutions performed for each customer order.

19. The computer program product of claim 17 wherein automatically substituting also depends on selecting for substitution an ordered item over another ordered item based on the corresponding quantity levels of the ordered item and the another ordered item.

20. The computer program product of claim 17 wherein said ordered item substitution is performed by an automated computer process.

21. The computer program product of claim 17 wherein said computer code for substituting includes:
computer code for determining a first preferred substitution item for the identified item; and
computer code for determining whether a sufficient quantity of the first preferred substitution item is available to be substituted for the identified item.

22. The computer program product of claim 21 further comprising computer code for determining a second preferred substitution item for the identified item in response to a determination that there is an insufficient quantity of the first preferred substitution item available to be substituted for the identified item.

23. The computer program product of claim 17 wherein said computer code for substituting includes computer code for partially substituting an ordered item for the identified item, said partial substitution code including:
computer code for reducing a quantity of the ordered item; and
computer code for adding a specified quantity of a new item in the respective customer order.

24. The computer program product of claim 17 wherein said computer code for substituting includes computer code for fully substituting an ordered item for the identified item, said full substitution including:
computer code for reducing a quantity of the ordered item to zero; and
computer code for adding a specified quantity of a new item in the respective customer order.

25. A system for effecting, via a computer network, substitution of at least one ordered item of at least one customer order for on-line shopping, the system comprising:
at least one central processing unit;
at least one interface configured or designed to receive at least one customer order placed by a customer through a computing device, via the computer network, the at least one customer order including more than one ordered item, with at least one ordered item having an ordered quantity larger than one, the customer order being a current order of the customer, including delivery time information regarding the order; and
memory;
wherein the processing unit is configured or designed to store in the memory customer order information and information regarding at least one substitution preference relating to at least one item substitution rule;
said system being configured or designed to analyze at least a portion of the received customer order taking into consideration at least another customer order to determine whether at least one item of inventory has been oversold, said analyzing being performed prior to the delivery of at least one ordered item of the received customer order and at least one ordered item of the at least another customer order;
said system being further configured or designed to identify an ordered item in the received customer order relating to an oversold item; and
said system being further configured or designed to automatically substitute, based upon information regarding said at least one substitution preference stored in the memory, at least one substitute item for the identified ordered item in the received customer order upon identifying the ordered item relating to the oversold item, the at least one substitution preference being provided by the customer,
wherein the automatic substitution depends on a ratio rule for substituting the substitute item for the identified ordered item,
wherein a quantity of the substitute item to be substituted for a quantity of the identified ordered item is not one for one, and is dependent on applying the ratio rule to the quantity of the identified ordered item,
wherein the customer is allowed to modify the at least one substitution preference during the current order, and
wherein the at least one interface is further configured or designed to show the image of at least one item to support the customer in placing the current order.

26. The system of claim 25 wherein to automatically substitute also depends on minimizing the number of order substitutions performed for each customer order.

27. The system of claim 25 wherein to automatically substitute also depends on selecting for substitution an ordered item over another ordered item based on the corresponding quantity levels of the ordered item and the another ordered item.

28. The system of claim 25 wherein said ordered item substitution is performed by an automated computer process.

29. The system of claim 25 wherein the system is configured or designed to compare the identified ordered item with at least another identified ordered item in another customer order related to the oversold item based upon the quantity associated with each of the identified ordered items.

30. The system of claim 25 wherein the system is further configured or designed to compare the identified ordered item with at least another identified ordered item in another customer order related to the oversold item based upon a number related to substitution already implemented in each customer order associated with the identified ordered item.

31. A computer-implemented method for effecting, via a computer network, substitution of at least one ordered item of at least one customer order for on-line shopping, the method comprising:

receiving, via the computer network, at least one customer order placed by a customer through a computing device, the at least one customer order including more than one ordered item, with at least one ordered item having an ordered quantity larger than one, the customer order being a current order of the customer, including delivery time information regarding the order;

analyzing at least a portion of the received customer order with at least another customer order to determine whether at least one item of inventory has been oversold, said analyzing being performed prior to the delivery of at least one ordered item of the received customer order and at least one ordered item of the at least another customer order;

identifying an ordered item in the received customer order relating to an oversold item; and upon identifying the ordered item relating to the oversold item, automatically substituting, based upon information regarding at least one substitution preference stored in a storage medium, at least one substitute item for the identified ordered item in the received customer order, the at least one substitution preference being provided by the customer;

wherein said substituting includes:

accessing said at least one substitution preference to determine a first preferred substitution item for the identified item; and determining whether a sufficient quantity of the first preferred substitution item is available to be substituted for the identified item, wherein said substituting depends on a ratio rule for substituting the first preferred substitute item for the identified item, wherein a quantity of the substitute item to be substituted for a quantity of the identified ordered item is not one for one, and is dependent on applying the ratio rule to the quantity of the identified ordered item, wherein the customer is allowed to modify the at least one substitution preference during the current order, and wherein the customer is allowed to view the image of at least one item through the computing device to support the customer in placing the current order.

32. The method of claim 31 further comprising determining a second preferred substitution item for the identified item in response to a determination that there is an insufficient quantity of the first preferred substitution item available to be substituted for the identified item.

33. The method of claim 31 wherein said substituting includes partially substituting an ordered item for the identified item, said partial substitution including:

reducing a quantity of the ordered item; and adding a specified quantity of a new item in the respective customer order.

34. The method of claim 31 wherein said substituting includes fully substituting an ordered item for the identified item, said full substitution including:

reducing a quantity of the ordered item to zero; and adding a specified quantity of a new item in the respective customer order.

35. A computer implemented method for effecting, via a computer network, substitution of at least one ordered item of at least one customer order for on-line shopping, the method comprising:

receiving, via the computer network, a plurality of customer orders, with at least one customer order including more than one ordered item placed by a customer through a computing device, with at least one ordered item having an ordered quantity larger than one for a particular item of merchandise, the customer order being a current order of the customer, including delivery time information regarding the order;

aggregating a selected portion of the plurality of customer orders, wherein the aggregated customer orders include a plurality of ordered items;

analyzing the plurality of ordered items, which include the at least one ordered item, to determine whether at least one item of merchandise has been oversold;

upon determining that at least one item has been oversold, automatically modifying at least a portion of the received customer orders by substituting alternate merchandise for ordered merchandise which has been identified as being oversold, where the substitution of merchandise items is implemented using information regarding at least one substitution preference stored in a storage medium, the at least one substitution preference being provided by the customer; and fulfilling the modified customer orders, wherein the modifying depends on a ratio rule for substituting the alternate merchandise for the ordered merchandise that has been identified as being oversold, wherein a quantity of the substitute item to be substituted for a quantity of the identified ordered item is not one for one, and is dependent on applying the ratio rule to the quantity of the identified ordered item, wherein the customer is allowed to modify the at least one substitution preference during the current order, and wherein the customer is allowed to view the image of at least one item through the computing device to support the customer in placing the current order.

36. The method of claim 35 wherein said substitution is performed automatically, without intervention by a human.

* * * * *

UNITED STATES PATENT AND TRADEMARK OFFICE
CERTIFICATE OF CORRECTION

PATENT NO. : 7,233,914 B1
APPLICATION NO. : 09/750385
DATED : June 19, 2007
INVENTOR(S) : Wijaya et al.

Page 1 of 1

It is certified that error appears in the above-identified patent and that said Letters Patent is hereby corrected as shown below:

Column 22, lines 45-48

"wherein a quantity of the substitute item to be substituted for a quantity of the identified ordered item is not one for one, and is dependent on applying the ratio rule to the quantity of the identified ordered item,"

should be

--wherein a quantity of the alternate merchandise to be substituted for a quantity of the ordered merchandise that has been identified as being oversold, is not one for one, and is dependent on applying the ratio rule to the quantity of the identified ordered merchandise,--.

Signed and Sealed this

Twenty-first Day of July, 2009

JOHN DOLL
*Acting Director of the United States Patent and Trademark Office*